(12) United States Patent
Miller

(10) Patent No.: US 7,398,806 B1
(45) Date of Patent: Jul. 15, 2008

(54) EASY MOUNT TIRE CHAINS

(76) Inventor: Ray R Miller, 2318 50th St. Ct. NW., Gig Harbor, WA (US) 98335

( * ) Notice: Subject to any disclaimer, the term of this patent is extended or adjusted under 35 U.S.C. 154(b) by 0 days.

(21) Appl. No.: 11/648,079

(22) Filed: Dec. 30, 2006

(51) Int. Cl.
*B60B 27/00* (2006.01)

(52) U.S. Cl. .................. 152/171; 152/175; 152/217; 152/231

(58) Field of Classification Search ............ 152/171, 152/175, 217, 218, 219, 221, 223, 231, 239
See application file for complete search history.

(56) References Cited

U.S. PATENT DOCUMENTS

| | | | | |
|---|---|---|---|---|
| 1,486,993 A * | 3/1924 | Stolpe | .................. | 152/242 |
| 3,842,881 A * | 10/1974 | Muller et al. | ............ | 152/213 A |
| 4,066,112 A * | 1/1978 | Goldstein | ................ | 152/213 A |
| 4,071,069 A * | 1/1978 | Raspet et al. | ............ | 152/213 A |
| 4,111,251 A * | 9/1978 | Bula | .................. | 152/219 |
| 4,215,733 A * | 8/1980 | Rieger et al. | ................ | 152/171 |
| 4,378,040 A * | 3/1983 | Howell | .................. | 152/213 A |
| 4,679,608 A * | 7/1987 | Jeindl | .................. | 152/213 A |
| 5,056,574 A * | 10/1991 | Maresh et al. | ............ | 152/241 |
| 5,082,039 A * | 1/1992 | Franklin | ............ | 152/241 |
| 5,236,025 A * | 8/1993 | Maresh | ............ | 152/219 |
| 5,236,026 A * | 8/1993 | Springer | ............ | 152/241 |
| 5,299,613 A * | 4/1994 | Maresh | ............ | 152/221 |
| 5,804,001 A * | 9/1998 | Christian | ............ | 152/241 |
| 6,026,876 A * | 2/2000 | Snyder | ............ | 152/218 |
| 6,651,713 B2 * | 11/2003 | Bergeron | ............ | 152/219 |
| 7,174,933 B1 * | 2/2007 | Miller | ............ | 152/171 |
| 2004/0226640 A1 * | 11/2004 | Woodworth et al. | ........ | 152/217 |

OTHER PUBLICATIONS

Traction Tire Chains Company Advertisement for "Auto Trac" Tire Chain Manufactured by Peerless Chain Co of Winona MN Downloaded from Internet on Dec. 25, 2006.

* cited by examiner

*Primary Examiner*—Russell D Stormer

(57) ABSTRACT

Configurations and mounting procedures for vehicle tire chains, which enable easier mounting of the chain upon the wheel, including performing the complete installation in one stop of the vehicle, while providing strong stabilization against random high operating forces on the chain.

13 Claims, 12 Drawing Sheets

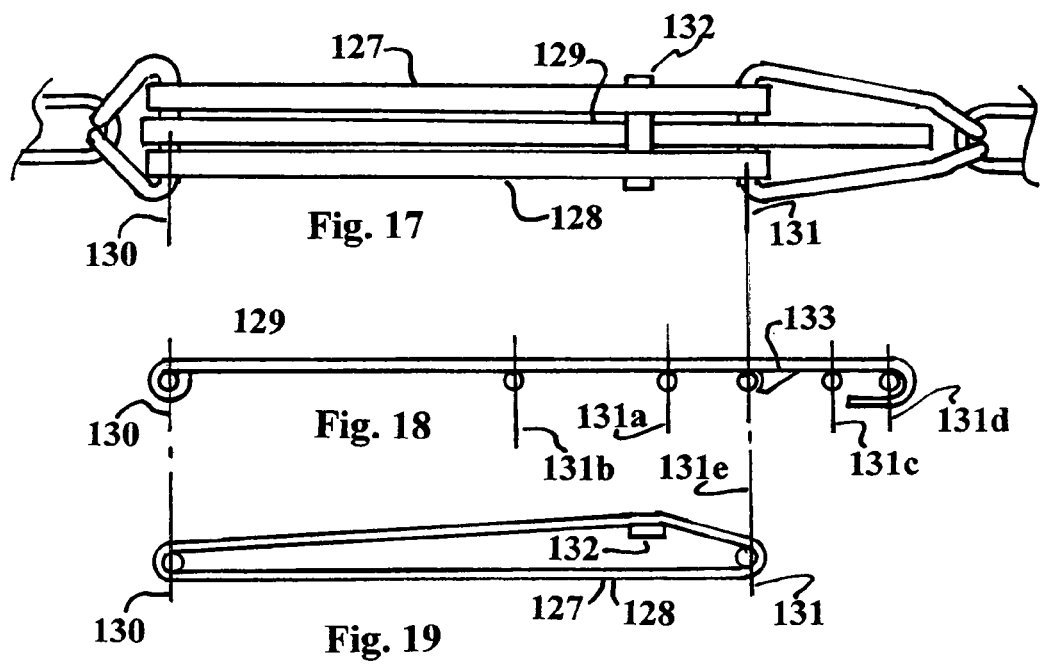
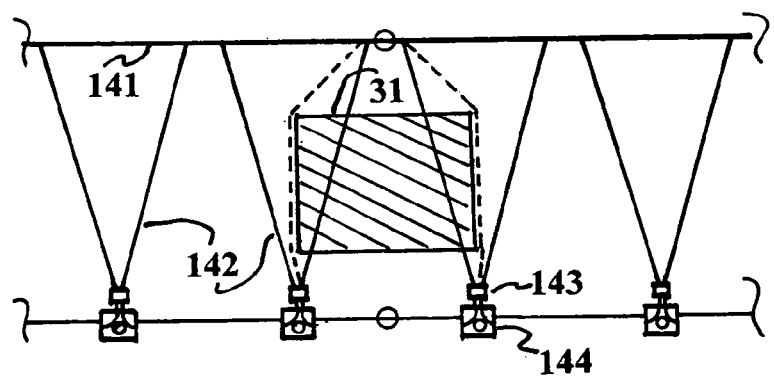

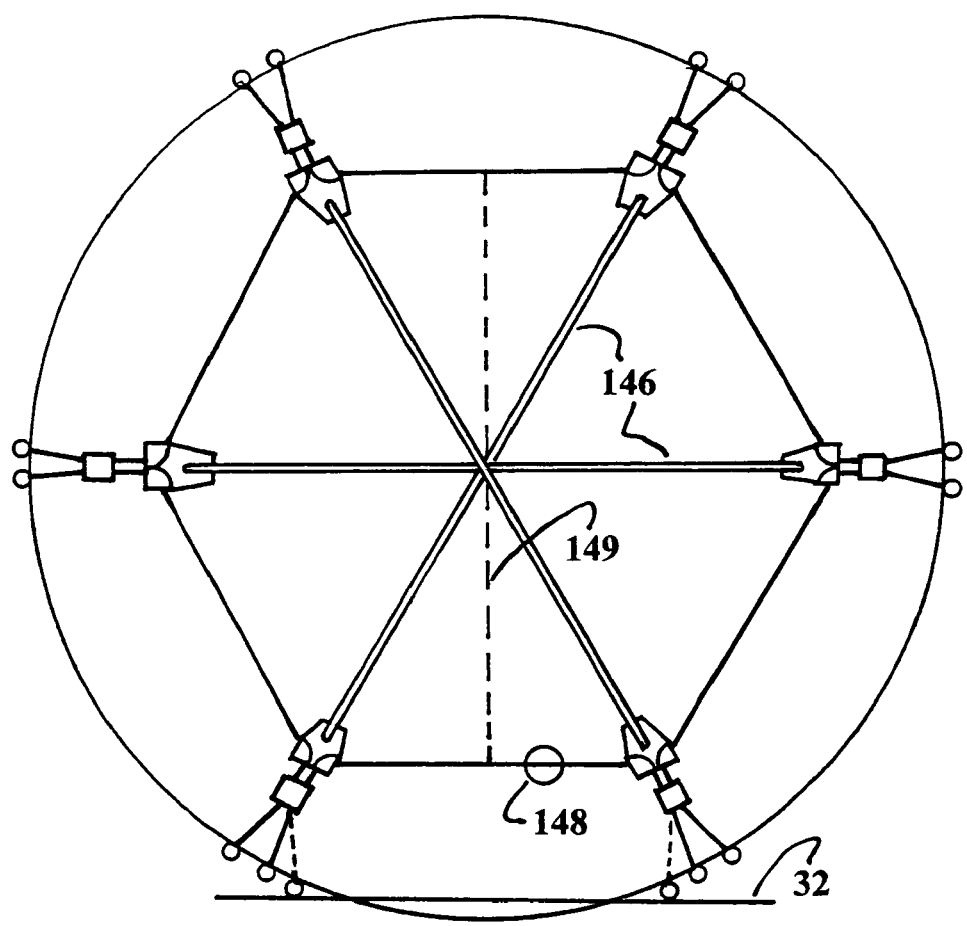
Fig. 21
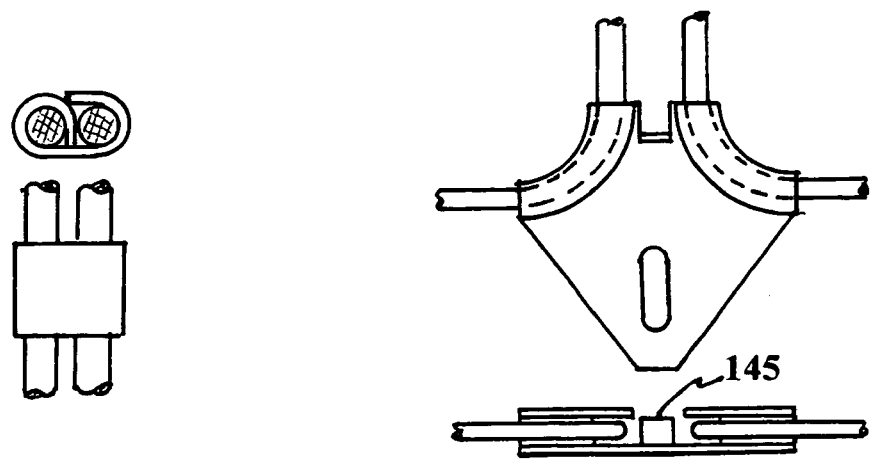
Fig. 22
Fig. 23

EASY MOUNT TIRE CHAINS

CROSS REFERENCE TO RELATED APPLICATIONS

This application is related to my U.S. Pat. No. 7,174,933.

FEDERALLY SPONSORED RESEARCH

Not applicable.

SEQUENCE LISTING OR PROGRAM

Not applicable.

BACKGROUND OF THE INVENTION

1. Field of the Invention

This invention relates to vehicle tire chains, specifically to tire chain configurations which provide easier mounting on the wheel.

2. Prior Art

It has long been an objective of the tire chain industry to make tire chains easier to mount on the wheel. Most chains use the "drive on" method because of the problem of the wheel sitting on the ground which represents an obstacle to placing the chain in that area. Many assistance devices are found in the art, such as ramps to drive the wheel onto, clips to carry the chain through the tire to ground contact area and the like.

U.S. Pat. No. 5,056,574, Maresh, et al, discloses a chain which mounts in one stop, but it is not strongly stabilized, being totally stabilized by elastic, rather than steel, and thus does not meet the performance levels of the chains of the present application.

Peerless Chain Company makes a tire chain, marketed by Traction Tire Chains, which tightens two cross chains with two self tightening ratchet mechanisms, to accomplish one stop mounting. They give the chain the trademark Auto-Trac.

U.S. Pat. No. 7,174,933, by the present inventor, pertains to the same general tire chain category as the present application.

The basic objectives of this present application are exactly the objectives of U.S. Pat. No. 7,174,933, that is: to provide a tire chain which can be fully mounted in one stop of the vehicle and which will provide strong stabilization of the chain in resisting random high operating forces on the chain, as encountered in severe turning and braking, and in skids.

The basic mounting techniques employed in the present invention are exactly those of U.S. Pat. No. 7,174,933, namely to employ a mounting technique and configuration which imposes cross chains upon the edges of the tire to ground contact area, and which includes self actuating return of deflected cross chains to their proper, normal position in the array on the tire tread, upon operation of the vehicle.

BRIEF SUMMARY OF THE INVENTION

The present invention discloses alternatives for enabling the chain to be mounted on the wheel during one stop of the vehicle, while maintaining good stabilization of the tire chain against operating forces. The three alternatives disclosed are very different from each other, and very different from the chain disclosed in U.S. Pat. No. 7,174,933.

The three alternatives herein are:

One based on sliding lateral support of the deflected cross chain.

One based on loop configuration of the cross chains.

One based on novel geometry of an otherwise standard chain.

OBJECTS OF THE INVENTION

The objective of this invention is to provide tire chains which can be mounted on the wheel sitting on the ground, in one stop of the vehicle, and have high resistance to de-stabilizing operational forces.

A further objective is to provide one stop mounting with a chain constructed completely of known, standard individual parts, assembled in a novel manner.

An additional objective is economical cost of manufacture of the chain, by way of simple design and standard parts.

An additional objective is to provide a tire chain for mounting in one stop, completely stabilized by steel, not relying on elastic for resistance to operating forces.

It is a further objective to provide a tire chain for mounting in one stop of the vehicle, which can be used on a wide range of tire sizes.

BRIEF DESCRIPTION OF THE DRAWINGS

FIGS. 17, 18 and 19. Details for FIGS. 15 and 16.

FIG. 20. A schematic partial plan view of a chain using loop construction of the cross chains.

FIG. 21. A schematic elevation view of the chain of FIG. 20.

FIGS. 22 and 23. Details for FIGS. 20 and 21.

DETAILED DESCRIPTION OF THE DISCLOSURE

Figure 1:
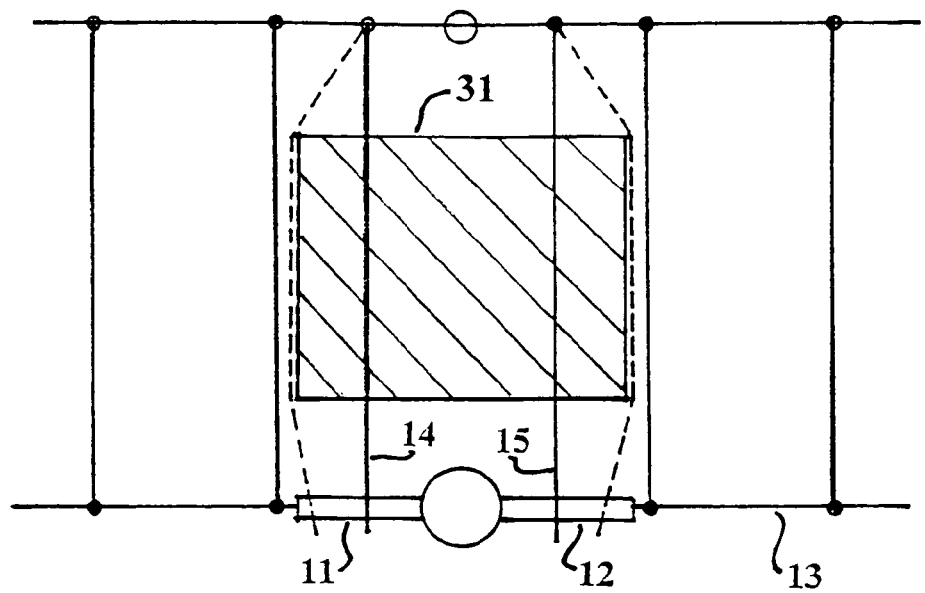
FIG. 1. A schematic partial plan view of a tire chain providing lateral sliding support of the deflected cross chains.
Figure 2:
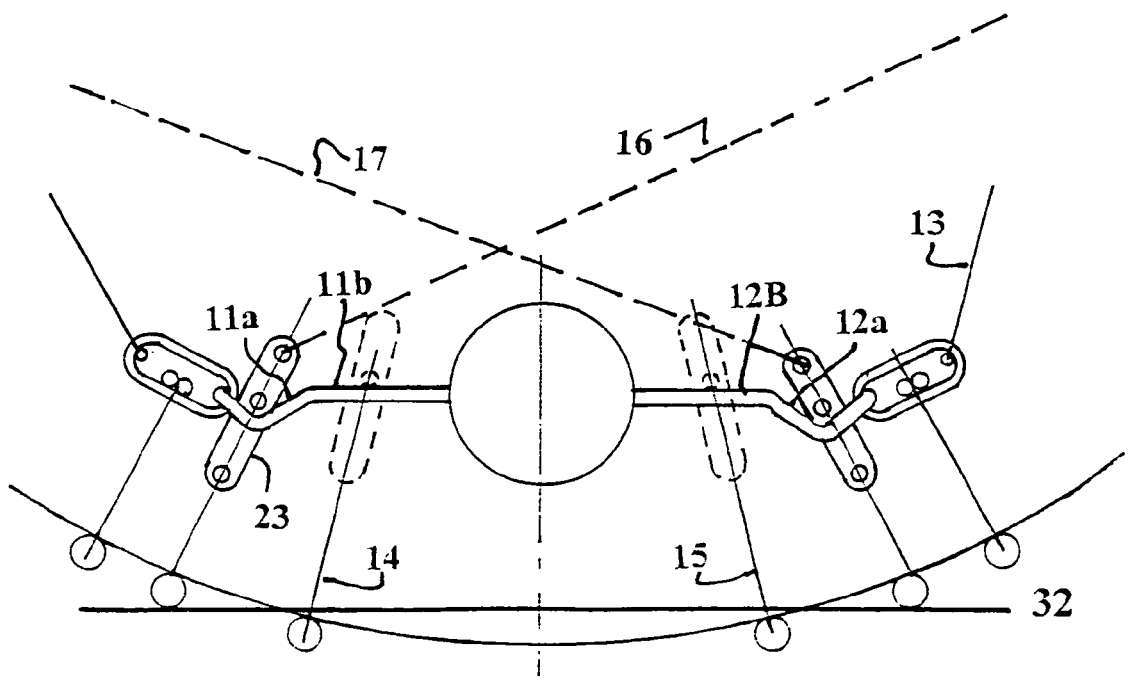
FIG. 2. A schematic elevation view of the chain of FIG. 1.

FIGS. 1 and 2 are schematic views of a ladder pattern tire chain, modified per the present invention.

The chain of FIGS. 1 and 2 enables one stop mounting by incorporating a laterally sliding connection of each deflected cross member to the outer face side member, to avoid the distortion of the chain due to cross member deflection and retraction.

In FIGS. 1 and 2, specially contoured support ramps 11 and 12 are built into outer face side member 13, to create sliding connections of deflected cross members 14 and 15. Each support ramp has a support zone (11a and 12a) for support of a cross member during initial installation on the wheel, and a support zone (11b and 12b) for cross member support during operation of the vehicle. Upon movement of the vehicle, which removes (relocates) the tire to ground contact pressure 31, a tension device (16 and 17) such as an elastic tightener band, pulls the end of the cross member from the initial mounting support zone to the operating support zone.

In the elevation, 32 is the ground line when ready for mounting of the tire chain.

Figure 3:
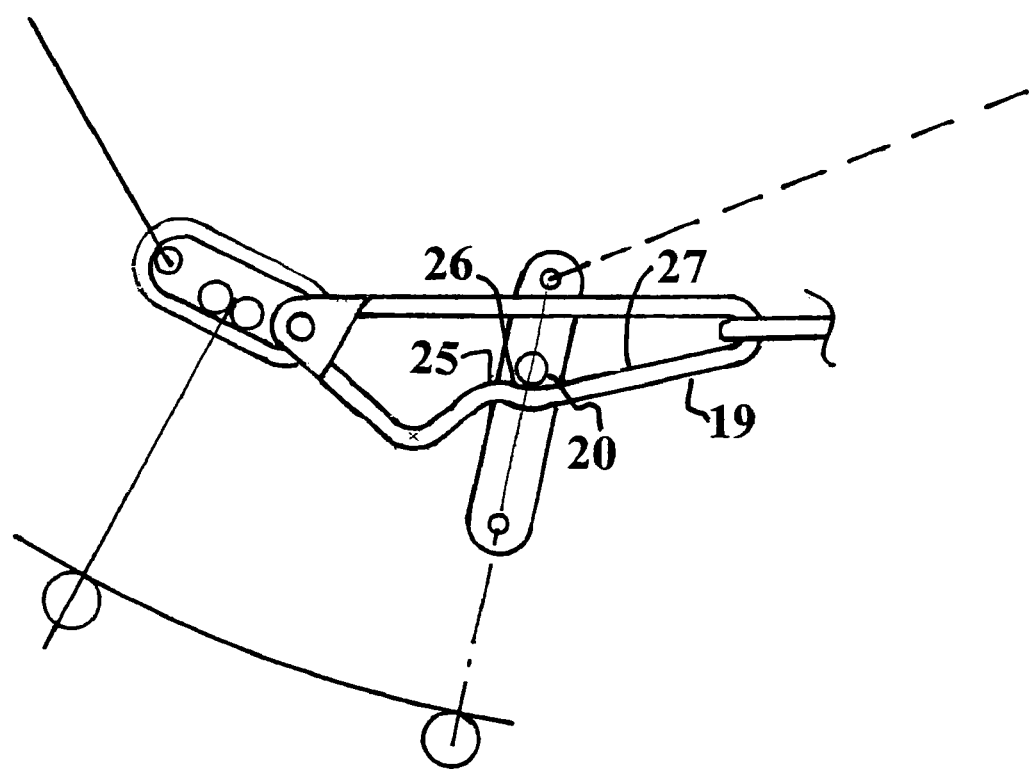
FIG. 3. A support ramp for the chain of FIGS. 1 and 2.

FIG. 3 provides a more detailed view of three areas which may be incorporated into the support zones of the ramps, for continuous operation. 25 is an initial non-return area of the ramp operating support zone with interacting angles of the support surface, the supported cross member, and the elastic tightener band, selected to allow the cross member to translate to the operating support zone from the initial mounting support zone, but be unable to return past the non-return area 25 upon imposition of random operating forces (tensions) upon the cross member such as due to skidding or heavy braking. 26 is a base support area of the operating support zone. 27 is an extended ramp area to ensure that there is room for the cross member extension to slide up the ramp, under tension of a tightener band, to the full extension of the cross member under all circumstances.

FIG. 3 is also drawn to illustrate an alternative configuration for the support ramp, in which the ramp has a single support rail 19, and the cross member extension has a projection 20 with a horizontal contact area for riding on the single rail. In FIG. 2, the ramp is shown as constructed with parallel support rails closely spaced, in the fashion of an elongated chain link, and the cross member extension 23 is in the nature of a flat bar, with support lugs projecting from the flat sides of the bar to engage the support rails.

An example wheel is utilized to give approximate comparative dimensions in this commentary. The example wheel has a tire diameter of 24 inches (59 cm), a tread width of 7 inches (17 cm), and a tire to ground contact area 10 inches long (25 cm), measured from the closest position of a typical link chain at each end of the contact area. All of the figures portray this example wheel.

Figure 4:
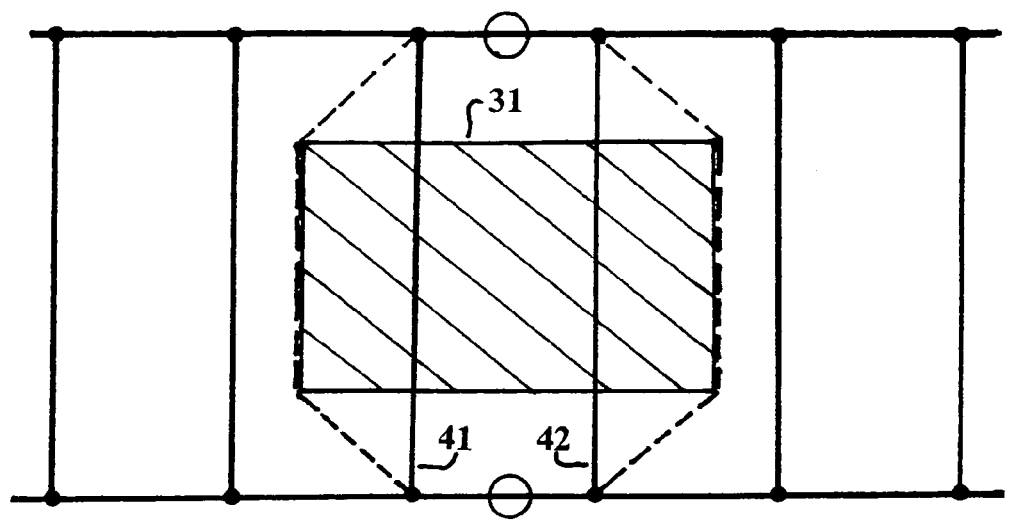
FIG. 4. A schematic partial plan view of a typical known art chain.
Figure 5:
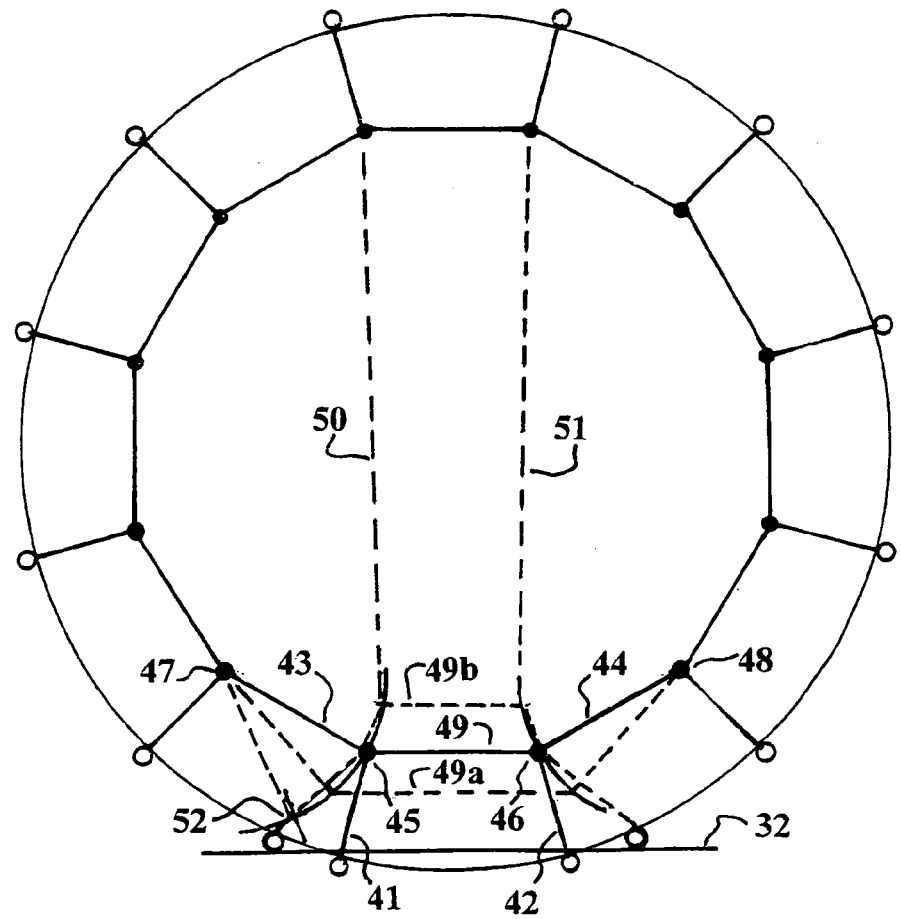
FIG. 5. A schematic elevation view of the chain of FIG. 4, mounted using the techniques of the present invention.

The merits of this present invention tire chain can only be fully understood by comparison with a typical known art tire chain, mounted in the manner of this invention, as shown in FIGS. 4 and 5. In each schematic plan view, 31 is the tire to ground contact area. In each elevation view, 32 is the ground line for the wheel.

A key aspect of the mounting system is the imposition of the adjacent cross members, 41 and 42, on the edges of the tire to ground contact area, deflecting the cross members from their natural positions.

Outer face side chain segments 43, 44, and 49 are shown at the proper location when mounted normally. When cross chains 41 and 42 are imposed on the tire to ground contact area 31, segment 43 acts as a radius about fixed point 47, constraining connection 45 to swing on the arc of 43.

The path of deflected cross chain 41 causes it to retract from point 45 about one and one half inches, so at initial mounting, segment 49 is fastened at location 49a, which translates to 49b during operation. The segment, at 49a and 49b is two and three quarters inches longer than at 49. The translation from location 49a to 49b occurs upon the relocation of cross members 41 and 42, based on the tension of elastic tightener bands 50 and 51, during initial operation of the vehicle.

A random high tension force on cross chain 41 would cause it to go to point location 52, which is the intersection of radius 43 and radius 49a plus 44, about point 48.

The location at point 52 destabilizes point 47.

Thus, the conclusion must be that a typical unmodified known art chain, mounted using the method of this invention, will not provide a high performance chain, due to the inferior stabilization during operation.

Figure 6:
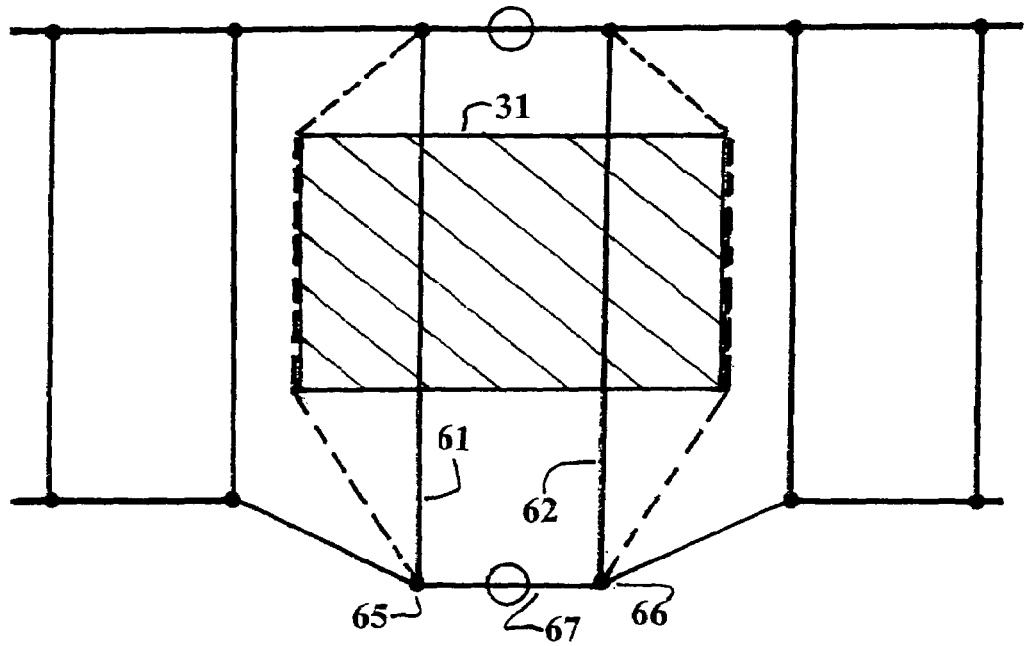
FIG. 6. A schematic partial plan view of a chain of the present invention.
Figure 7:
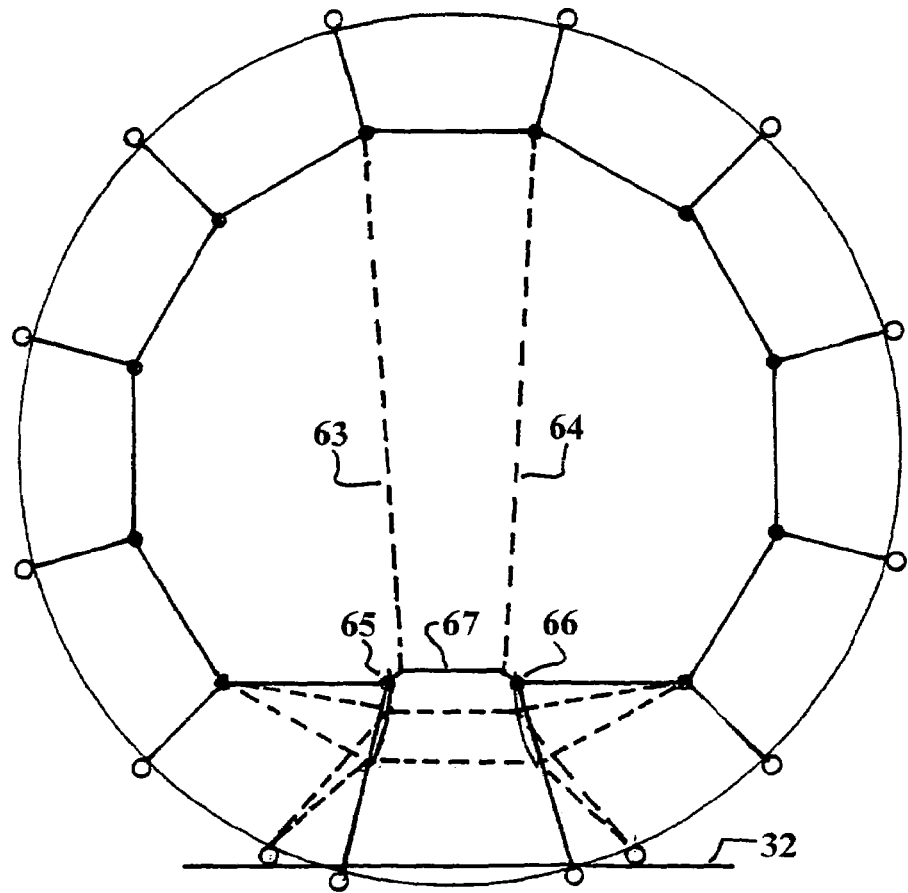
FIG. 7. A schematic elevation view of the chain of FIG. 6.

In FIGS. 6 and 7, illustrating a chain configuration modification of the present invention, any lengthening of deflected cross members 61 and 62 will be beneficial in reducing the slack introduced into side chain segment 67 by the chain mounting process.

Figure 8:
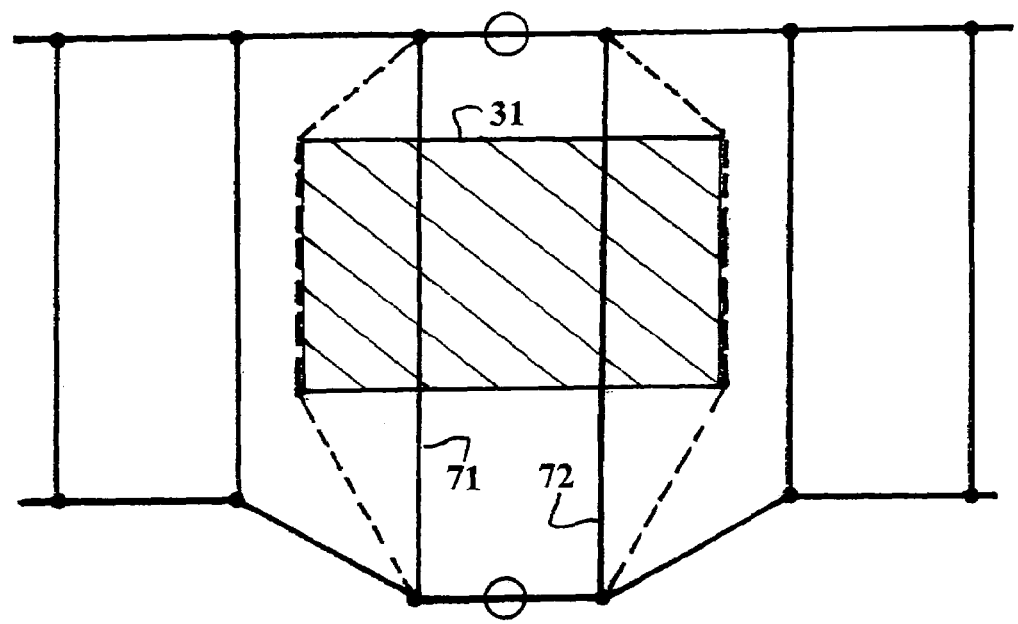
FIG. 8. A further version of a chain of the present invention-optimum.
Figure 9:
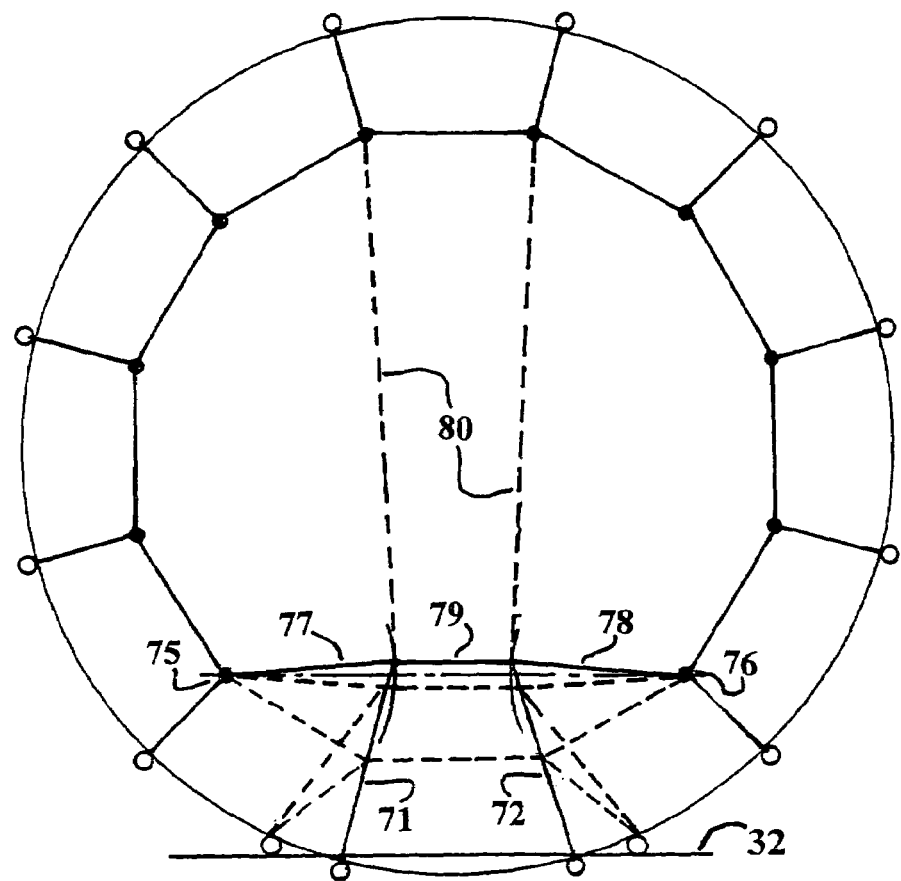
FIG. 9. A schematic elevation view of the chain of FIG. 8.

FIGS. 8 and 9 illustrate that the optimum lengthening of deflected cross members 71 and 72 is for the two members to extend to an operating position of one half of the amount of retraction of points 73 and 74 due to deflection, beyond a straight line between connections 75 and 76 of adjacent non-deflected cross members to the outer face side member. On the example wheel, the amount of retraction is approximately three quarter inches (1.9 cm), so the cross members will be attached approximately three eighths inch (0.95 cm) beyond the reference line (in operating position).

That location makes the arcs of radii 77 and 78 each symmetrical about the reference line and causes outer face side member segment 79 to remain, during operation, at the same length at which it was initially fastened.

That optimum length of the deflected cross members is also the maximum length for them, as segment 79 cannot be further lengthened from its initial fastening length to segments 77 and 78, thus the arcs of the radii cannot diverge beyond the operating position shown.

Other useful modifications are possible while also utilizing the optimum length of deflected cross members, as noted in the following.

Figure 10:
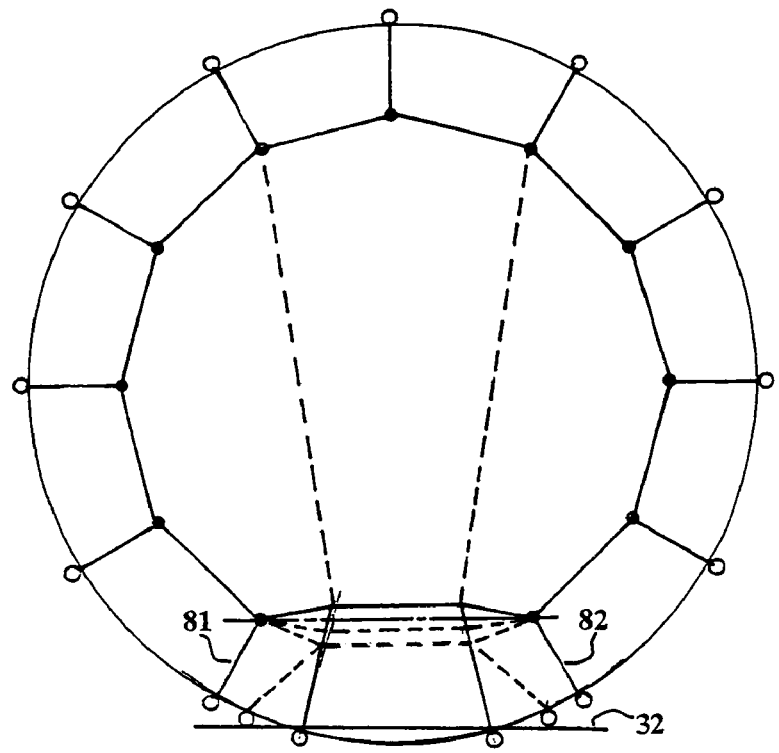
FIG. 10. A further version of a chain of the present invention-close spacing.

In FIG. 10, reducing the spacing between adjacent non-deflected cross members 81 and 82 and the pair of deflected cross members, which are installed in the manner of FIGS. 8 and 9, can be accomplished while maintaining the typical spacing of the multiplicity of cross members, by adding one typical cross member. This will shorten the total space between adjacent non-deflected cross members and improve the stability of the chain.

Figure 11:
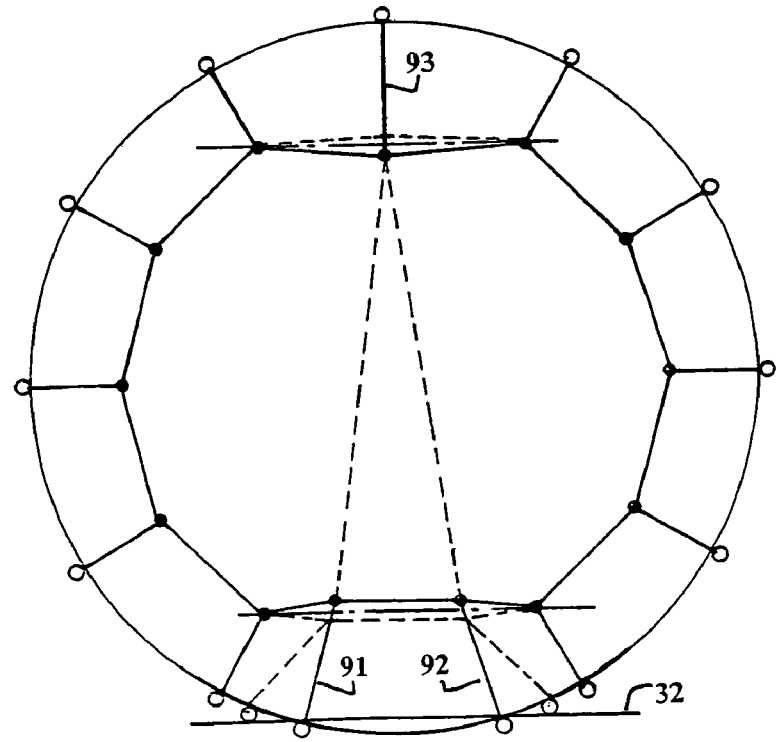
FIG. 11. A further version of a chain of the present invention-mirror image.

FIG. 11. illustrates a method of reducing the un-stabilized (by steel) movement in the lowest outer face segment, by taking about half of the deflected cross chain retraction to the upper segment of the outer face side chain. FIG. 11 shows the chain of FIG. 10 with an approximate mirror image of the special pattern described in FIG. 10 which is used here to absorb half the retraction amount to minimize the impact on stability of the chain.

Cross members 91 and 92 have a length to place them one fourth of the retraction amount due to deflection, beyond the reference line, in an operating condition.

An approximate mirror image pattern is used at the top of the chain, by having cross member 93 lengthened to be one fourth of the retraction distance, during operation, beyond a reference line between adjacent cross member connections. This facilitates one half of the retraction amount of deflected cross chains being transferred up the back side of the chain, over the top, to the mirror image pattern.

Figure 12:
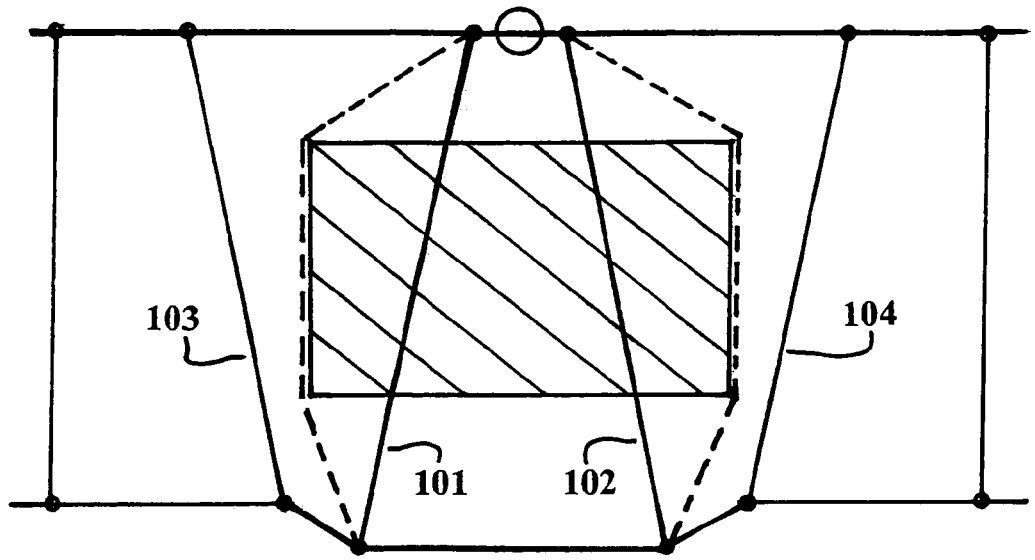
FIGS. 12 and 13. A further version of a chain of the present invention-diagonal orientation.
Figure 13:
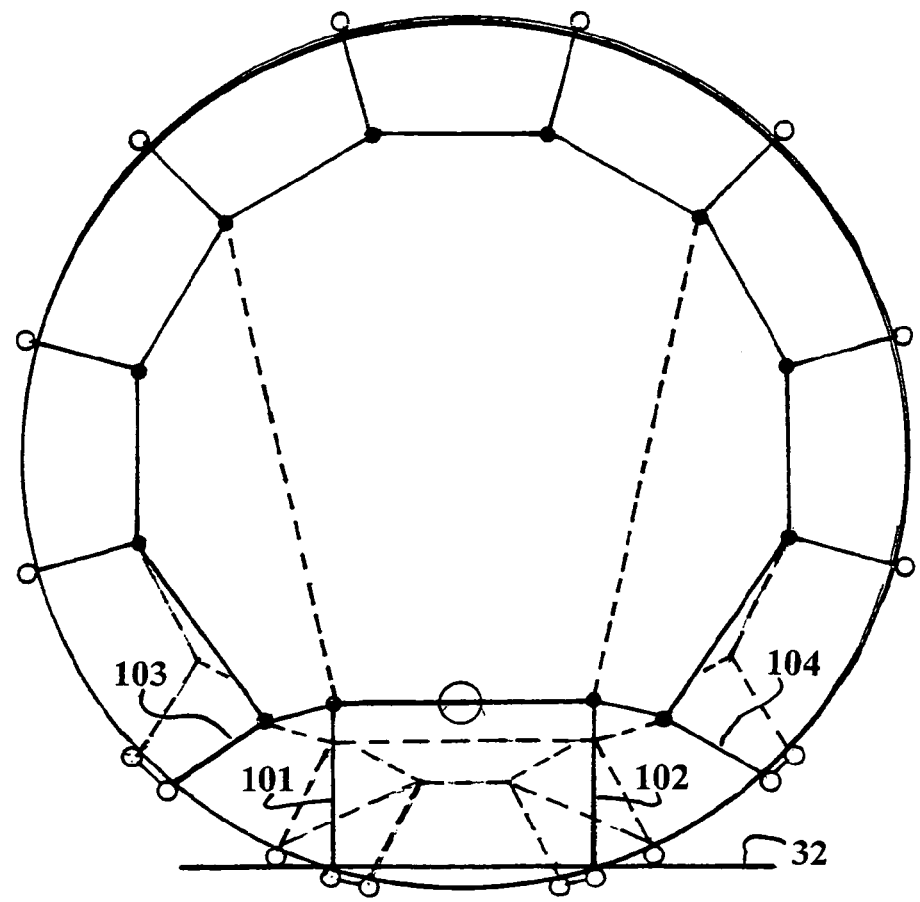

In FIGS. 12 and 13, the two deflected cross members 101 and 102 and adjacent non-deflected cross members 103 and 104 are installed diagonally, thus reducing the distance between cross member pairs at their outer face side member connections, thereby improving the stability of the chain. The spacing of the cross member connections to the inner face side member is not relevant.

Figure 14:
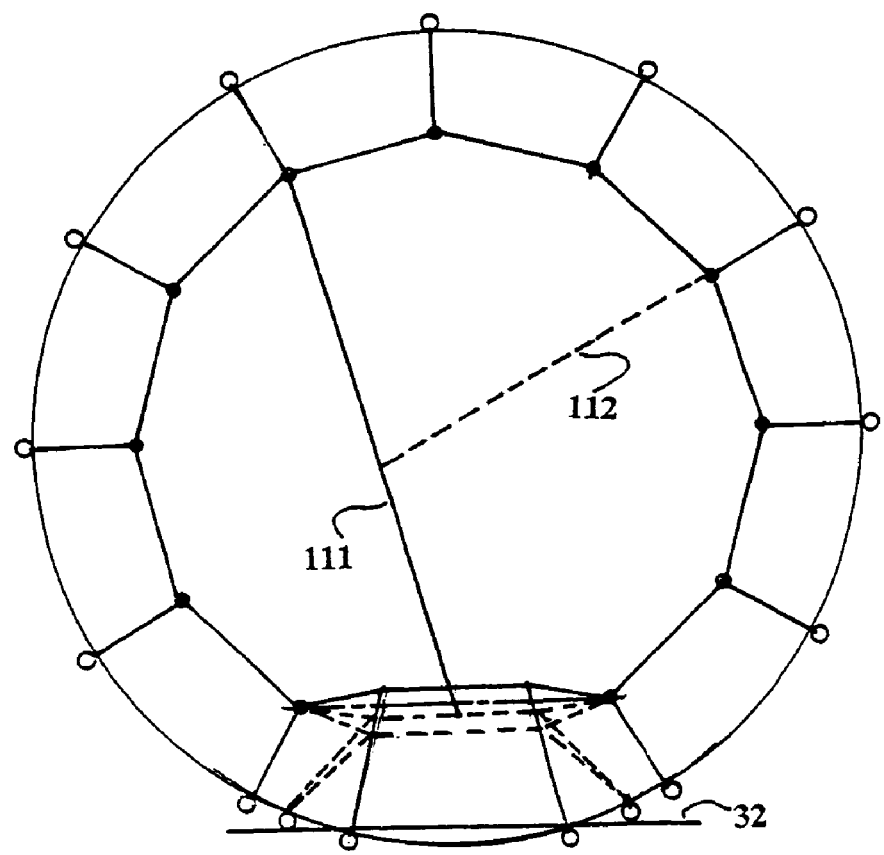
FIG. 14. Alternative support for the present invention.
Figure 15:
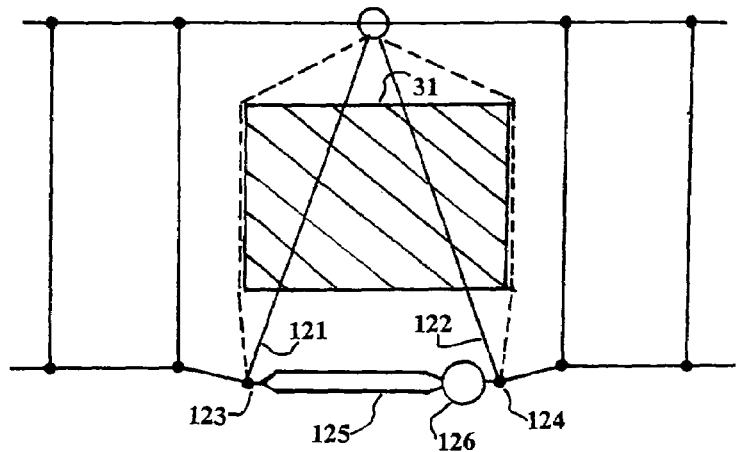
FIGS. 15 and 16. Plan and elevation for integral tension for the present invention.

FIG. 14 illustrates an alternative method of tensioning the deflected cross members. A non-elastic connector 111 is manually hooked to the outer face side chain near the deflected cross chain attachments, and to another location on the outer face side chain. An elastic tightener band 112 is attached in mid span of the non-elastic connector and to the side chain.

This arrangement has the advantage of leveraging the elastic band tension and also providing solid support for the deflected cross chains, when the connector is extended by random high operating forces.

FIGS. 15, 16, 17, 18 and 19 show an example of providing the necessary tension mechanisms to pull the deflected cross chains into position, by incorporating the mechanisms integrally into the outer face side chain.

The example is based on the characteristics of the tire chain of FIGS. 6 and 7. That tire chain has some characteristics which are less than ideal:

1. It compromises support angles of components vs. a standard chain.
2. It requires manual addition of an elastic tightener.
3. It allows a small residual movement of deflected cross members, which is not stabilized by steel.

There is a myriad of potential specific configurations for chains with integral tension mechanisms, but this example provides the following features, as compared to the tire chain of FIGS. 6 and 7.

1. The support angles of components are the equivalent of a standard chain.
2. It requires no manual addition of an elastic tightener.
3. The residual movement of deflected cross members, not stabilized by steel, is reduced.
4. Random high operating forces on deflected cross members, transmitted to the outer face side member segment between the two deflected cross members, is reduced, due to connecting angles.

Deflected cross chains 121 and 122 are at the spacing of the standard ladder chain, but are diagonally oriented, primarily to provide adequate space on the outer face side chain segment between connections 123 and 124 for tension mechanism 125 and attachment device 126.

Attachment device 126 is any attachment device which provides some leverage to enhance the manual attaching force, such as a cam device.

Tension mechanism 125 is shown in FIGS. 17, 18, and 19. 127 and 128 are elastic bands. 129 is a pivoted bar which acts as a non-return device.

Assuming the connection point 130 to be at fixed location, the closest point of connection 131 will be 131a, as further contraction is prevented by bar 132 attached to pivoted bar 129. The elastic bands 127 and 128, pass above bar 132, therefore the elastic bands are installed under tension. The bands keep pivoted bar 129 in contact with the end fitting 131. Position 131b is not attainable. It merely represents the zero tension length of the tension bands.

In mounting the chain, the deflected cross chains retract to connection points 135 and 136. When the side chain is attached at 126, connection 131 is pulled to location 131c.

The hook end at 131d is merely a safeguard against over stressing the elastic bands.

When the vehicle moves, removing the tire to ground pressure, the tension bands contract to position 131e, engaging the non-return projection 133, to ensure stability against random high operating forces on the cross chains.

Figure 16:
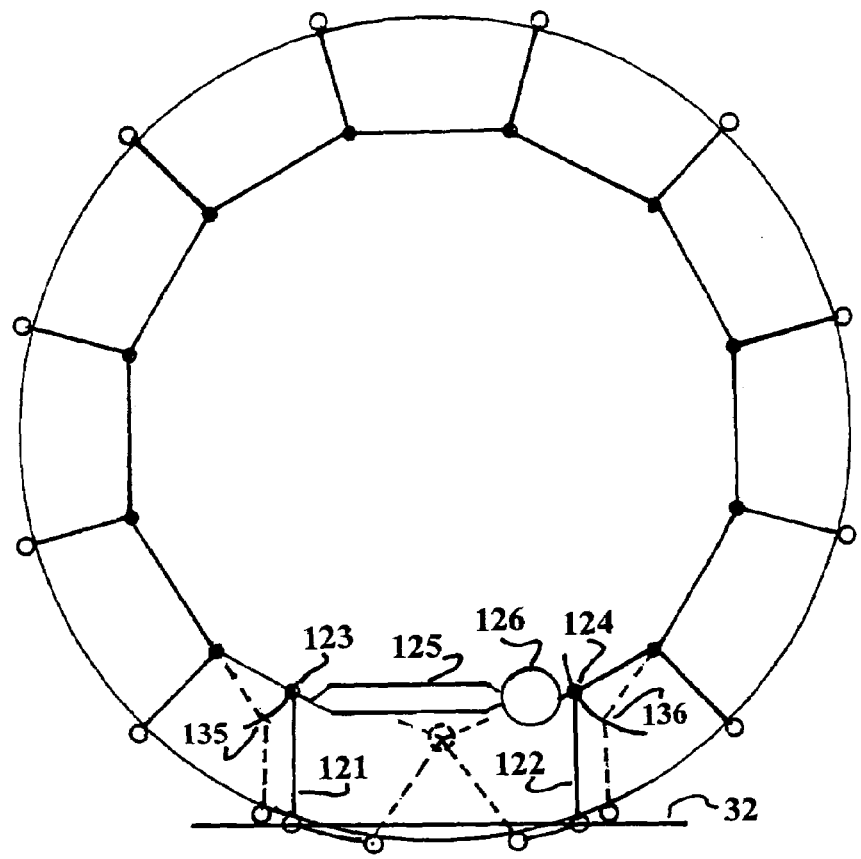

In the example shown, from FIG. 16 it is evident that the required contraction distance of the tension bands will be about one and a half inches, which is the distance from connections 135 to 136 minus the distance from connections 123 to 124. Thus, the distance from 131c to 131e will be about one and one half inches.

The force required to move deflected cross chains is quite small. Call it one pound. A significantly higher tension value, at operating condition (131e), will be selected to provide a snug chain, beyond the non-return point.

FIGS. 20 and 21 show a wire cable chain in a diagonal pattern, which is adapted for one stop mounting by using the principles of the present invention.

The chain has a typical inner face side member 141. The cross members are formed by a multiplicity of loops 142 attached to the inner face side member. Adjacent loops are joined by two piece attachment devices on the outer face of the tire.

Just beyond the outer face corner of the tread, a strap type or clamp type fitting 143 joins adjacent loop sides at a close spacing. At least the uppermost and lowermost loops at initial chain installation have these fittings applied in a manner to hold one cable in a fixed manner, and the other in a freely sliding manner, to permit relative endwise movement of the two cables.

Just beyond fittings 143, is a guide type attachment 144 which has an arcuate guide surface for each cable, to direct it toward the completion of the loop, through a similar adjacent fitting. Fittings 143 and 144 are shown in more detail in FIGS. 22 and 23.

Figure 24:
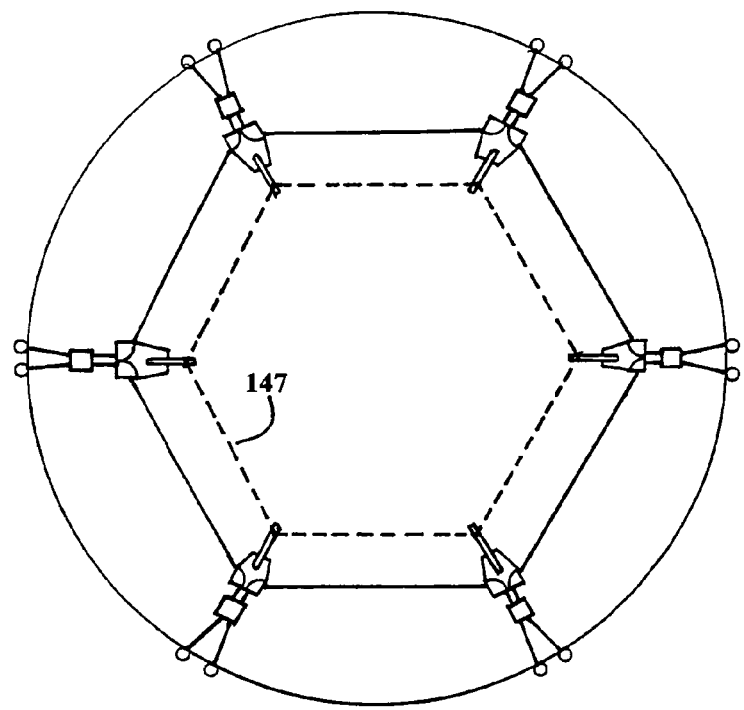
FIG. 24. The chain of FIGS. 20 and 21 stabilized by a loop of link chain.

The guiding attachments 144 are freely sliding on the cables, but have a retainer tab 145 to keep the cables within the guide passages. These guiding attachments are connected by non-elastic connectors in one of two optional ways: either a rod or cable type connector 146 is manually applied between each opposed pair of attachments, as in FIG. 21, or a flexible non-elastic loop 147, such as link chain, is hooked to each attachment, as in FIG. 24

The lowermost loop end is fitted with an attachment device 148, so the chain can be installed in a manner in which an adjacent pair of cross members is imposed upon the edges of the tire to ground contact area.

After the lowermost loop end is attached to complete the loop, an elastic tension band 149 is manually applied to the uppermost and lowermost loop ends, to pull the deflected cross members into their proper positions, upon operation of the vehicle. The chain is then fully installed.

The chain can optionally be fitted with a tension mechanism, integral to the lowermost loop end, in lieu of the manually applied tension band. The mechanism can be as described in FIGS. 17, 18 and 19. An additional option is to use the integral tension mechanism in both the lowermost and uppermost loop end.

Figure 25:
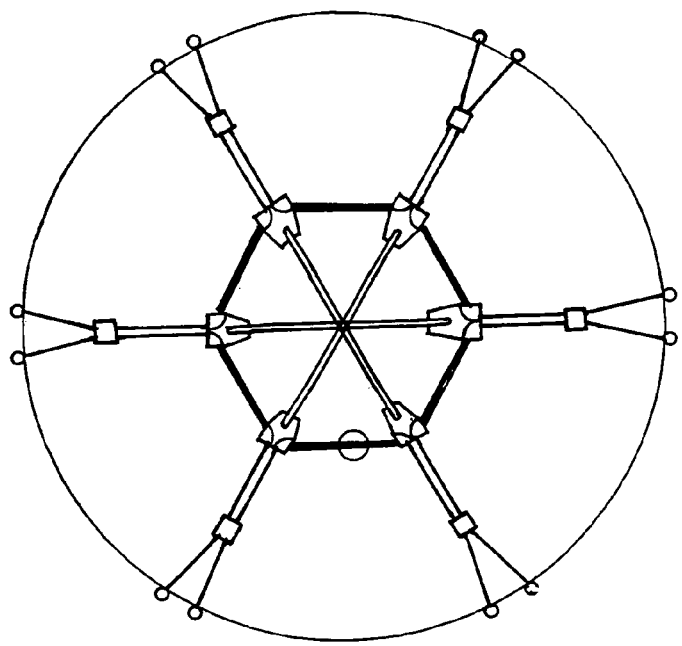
FIG. 25. The chain of FIGS. 20 and 21 used for a reduced tire size.

FIG. 25 shows the chain of FIGS. 20 and 21, used on a smaller tire size, and fitted with cross connectors to suit the smaller tire.

SUMMARY AND CONCLUSIONS

The present invention, together with application Ser. No. 11/116,898, discloses tire chains which mount in one stop of the vehicle and which are inherently stronger and more robust than one stop chains in the prior art.

It will be evident to those skilled in the art that many variations can be made in the configurations, which are not herein described in detail. These variations should be considered to be within the scope of the invention if within the encompass of the appended claims.

I claim:

1. A tire chain, for installation on a vehicle wheel resting on the ground, or roadway, comprising
    a generally circular, flexible side member on the inner face side of the tire,
    a generally circular, flexible side member on the outer face side of the tire,
    an attachment device provided on each side member to attach the ends for each to form a loop on the wheel,
    a multiplicity of flexible cross members between the two side members, arrayed on the tire tread in a repetitive pattern, and
    the pattern is of such density that there is always a cross member in the tire to ground contact area during operation, and
    the wheel has a vertical centerline, as it rests on the ground ready to receive the tire chain, and it has a center of rotation, and
    the installation procedure includes the step of imposing adjacent cross members upon the edges of the tire to ground contact area, such that one or both of said adjacent cross members are deflected from their natural positions in the pattern, and
    said adjacent cross member, or members, deflected from their natural positions, are each slidably connected to the outer face side member by means of a fitting on the outer face end of the cross member, adapted to slide on, and be supported by a ramp support means built into the outer face side member, and
    the ramp support means has two interconnected support zones, comprising a first zone positioned at the end of the ramp support means away from the wheel vertical centerline, to support the cross member end in its initial installation, deflected, retracted position, and a second zone, positioned at the end of the ramp support means nearer the wheel vertical centerline, and positioned to support the cross member end in its vehicle operating position, and
    the outer face end of each deflected cross member is adapted to connect to a tension means, for manual attachment, to provide tension onto the deflected cross member at all times during operation, and positioned to pull the cross member end radially inward toward the wheel center of rotation.

2. The tire chain of claim 1 in which the support zone of the ramp support means for support during continuous operation, has three areas, comprising a first area, which is a slightly raised area of the ramp support means and which defines a limit which the cross member end fitting will not re-cross, once it has crossed into the operating support zone, and a second area,
    comprising a slightly depressed area, which serves as the initial supporting portion of the operating support zone, and a third area, comprising an upwardly sloped ramp area, that is sloped up, radially inward, and is long enough to accommodate the furthest reach of the cross member.

3. The tire chain of claim 1 in which the ramp support means comprises an elongated chain link with side bars side by side horizontally at close spacing, and an extension of the deflected cross member, comprising an essentially flat bar shape, with projections from the flat sides, which ride upon the supporting side bars of the ramp support means.

4. The tire chain of claim 1 in which the ramp support means comprises a shaped single rail and the extension of the deflected cross member has a lateral projection which rides upon the top surface of the shaped single rail.

5. A tire chain, for installation on a vehicle wheel resting on the ground, or roadway, comprising
    a generally circular, flexible side member on the inner face side of the tire,
    a generally circular, flexible side member on the outer face side of the tire,
    an attachment device provided on each side member to attach the ends for each to form a loop on the wheel,
    a multiplicity of flexible cross members arrayed on the tire tread, between the two side members, and
    the pattern of cross members is of such density that there is always a cross member in the tire to ground contact area during operation, and the installation procedure includes the step of imposing one pair of adjacent cross members upon the edges of the tire to ground contact area, whereupon said adjacent cross members are significantly deflected from their normal position in the pattern, and
    the outer face side member attachment means is located between said adjacent cross members, so imposed, and
    the two adjacent deflected cross members are lengthened, compared to the multiplicity of un-deflected cross members, and
    after the inner face side member is connected into a loop on the wheel, the two adjacent lengthened cross members are manually imposed upon the edges of the tire to ground contact area, and
    the outer face side member ends are attached for the side member to form a loop on the wheel, and
    a tension means is attached to the outer face side member near the connection points of the deflected cross members, so that
    upon operating the vehicle and turning the wheel, the tension means will pull the deflected cross members into their natural positions in the pattern, whereupon the tire chain is fully installed.

6. The tire chain of claim 5 in which each member of the adjacent pair of deflected cross members is lengthened, and
    the length is such that, upon complete installation of the chain and operation of the vehicle, the connection points of the deflected cross members to the outer face side member are in a location radially inward, by a distance of approximately one half of the distance of retraction of the outer end of each deflected cross member, caused by deflection due to imposition on the tire to ground contact area, from a straight line between the respective connections of the two adjacent non-deflected cross members to the outer face side member.

7. The tire chain of claim 6 in which the configuration of the outer face side member and the lengthened deflected cross members at the bottom of the outer face is repeated in an approximate mirror image at the uppermost area of the outer face, and there is no attachment device in said uppermost area, and
    one or more cross members at the top of the outer face are lengthened such that in the fully operating condition, the connection of said lengthened cross members with the outer face side member is beyond, radially inward, a straight line between the respective connections of the two adjacent cross members with the outer face side member, by a distance of approximately one fourth of the retraction distance of the deflected cross members, and the deflected cross members are lengthened beyond their comparable reference line by an approximate distance of one fourth of their retraction distance, and the pattern at the top of the outer face will absorb approximately one half of the retraction distance of the two deflected bottom cross members, thus leaving approximately one half of the retraction distance to be absorbed by the pattern at the bottom of the front face, and upon mounting the chain, one or more elastic tightener bands are installed between the outer face side member near the connections of the uppermost lengthened cross members and the bottom most lengthened cross members, and the chain is fully installed.

8. The tire chain of claim 5 in which an additional cross member is added to the multiplicity of cross members, while maintaining the typical spacing of said multiplicity as a maximum spacing, to enable a closer spacing between the adjacent pair of deflected cross members and the two respective non-deflected cross members nearest said adjacent pair of deflected cross members.

9. The tire chain of claim 5 in which tension means to return deflected cross members into their normal positions is constructed integrally with the outer face side member segment between the two deflected cross members, and said tension means is configured with an integral non-return means to prevent retraction of the deflected cross members after they have reached their natural positions.

10. A wire cable tire chain, for installation on a vehicle wheel resting on the ground, or roadway, comprising a flexible inner face side member with an attachment means to form a loop on the wheel, and an array of cross members on the tire tread in an alternating diagonal pattern, comprising a multiplicity of flexible loops attached to the inner face side member, with the sides of each loop diverging across the tread, in a pattern sufficiently dense that there is always a cross member in the contact area of the tire to the ground, and the sides of each pair of adjacent loops are joined, at close spacing, by a strap or clamp fitting, on the outer face of the tire, and at least said fittings on the uppermost and lowermost loops, during initial installation, are constructed to attach fixedly to one of the side cables, and attach slidably to the other side cable, to enable relative endwise movement of the two cables, and the pair of loop side cables just beyond each said strap or clamp fitting is fitted with a guide means having an arcuate guide portion for each of the two cables, wherein each cable emerges from the loop side attachment onto the arcuate guide and is slidably guided in the direction of the next adjacent arcuate guide, to complete the path of the loop, and said guide attachments slide freely on said cables, and said guide attachments are cross connected by manually attachable non-elastic connectors, to stabilize the tire chain during operation, and during installation of the tire chain the two sides of the lowermost loop are imposed upon the edges of the tire to ground contact area, thereby deflecting the loop sides, comprising cross members, and causing them to retract from the outer face, and the midpoints of the lowermost loop and the uppermost loop are connected by a tension means, to pull the deflected cross members into their normal positions, upon initial operation of the vehicle, by applying tension directly to the outer face ends of the deflected cross members, and applying tension to the uppermost loop, which transmits the tension over the top of the wheel and down the inner face to the inner face ends of the deflected cross members, thus enabling roughly half of the retracted distance to go to the lowermost loop and roughly half of the retracted distance to go to the uppermost loop, so that the tire chain can be mounted in one stop of the vehicle.

11. The tire chain of claim 10 in which the tension means to pull the two sides of the bottom loop into their normal positions is incorporated integrally into said loop end, and the integral tension means incorporates a non-return means to prevent retraction of the deflected loop sides after reaching their normal operating positions.

12. The tire chain of claim 10 in which the tension means to pull the two sides of the bottom loop into their normal positions is an integral tension means, with non-return means, incorporated into the bottom loop end and into the top loop end.

13. The tire chain of claim 10 in which said chain is applied to a smaller tire size, and is fitted with a different set of connectors across the outer face.

* * * * *